ID="21 Claims"## United States Patent Office 3,766,142
Patented Oct. 16, 1973

3,766,142
ACRYLONITRILE COPOLYMERS
Eric Nield, Watton-at-Stone, and John Brewster Rose, Letchworth, England, assignors to Imperial Chemical Industries Limited, London, England
No Drawing. Continuation-in-part of abandoned application Ser. No. 767,481, Oct. 14, 1968, which is a continuation-in-part of applications Ser. No. 537,028, Mar. 23, 1966, and Ser. No. 729,891, May 17, 1968, now Patent No. 3,652,891, which in turn is a continuation-in-part of abandoned application Ser. No. 447,971, Apr. 14, 1965. This application Nov. 8, 1971, Ser. No. 196,743
Claims priority, application Great Britain, Apr. 21, 1964, 16,502/64; Nov. 6, 1964, 45,289/64; May 22, 1967, 23,670/67
Int. Cl. C08f 19/10; C08g 33/02
U.S. Cl. 260—47 UA
17 Claims

ABSTRACT OF THE DISCLOSURE

The novel copolymers contain acrylonitrile (1–99 moles percent) and an N-arylmaleimide (99–1 mole percent). The copolymers may also comprise 25–90 mole percent acrylonitrile, from 1–25 mole percent of N-aryl maleimide and from 0–70 mole percent of at least one other ethylenically unsaturated monomer copolymerisable therewith. When the other monomer is an alkene or diene, the quantity is limited to the range from 0–50 mole percent, and where the other monomer is an aromatic olefin the molar ratio of aromatic olefin to acrylonitrile lies within the range 0.5–4, preferably 1–4. The copolymer is prepared by mixing the monomers together, preferably in a liquid diluent and polymerising the mixture under conditions of free radical catalysis.

---

This case is a continuation-in-part of U.S. Ser. No. 767,481, filed Oct. 14, 1968, now abandoned, which was a continuation-in-part of abandoned U.S. Ser. No. 537,028, filed Mar. 23, 1966, and Ser. No. 729,891, filed May 17, 1968, now U.S. Pat. 3,652,891 which was a continuation-in-part of abandoned U.S. Ser. No. 447,971, filed Apr. 14, 1965.

The present invention relates to modified polymers of acrylonitrile. Polyacrylonitrile may be formed by polymerisation in bulk, solution or aqueous suspension and is a useful fibre-forming material of high softening point and good resistance to a wide variety of chemicals. However, its wider use as a materal for fabricating in molten form, e.g. in melt-extrusion or injection moulding processes, is restricted by its poor thermplasticity even at temperatures as high as 250° C.; thus, it is mouldable only with the use of high pressures and at temperatures at which degradation may occur. Moreover, articles moulded from the polymer tend to shatter, breaking at a stress often as little as 2 kg./mm.$^2$ and seldom more than 4 kg./mm.$^2$ when tested for flexural strength at 20° C.

It has been proposed to modify the properties of acrylonitrile polymers by adding other copolymerisable monomers to the polymerisation reaction. Vinyl chloride, vinylidene chloride and butadiene are common examples of such monomers. While the products may be less brittle and easier to mould, they generally suffer from low softening point or low modulus. Thus they are generally unable to withstand temperatures as high as 100° C. or are unable to yield rigid articles on moulding.

It has now been found that acrylonitrile polymers with improved moulding characteristics, high softening point (generally of the order of 100° C. or above) and useful physical properties may be obtained by copolymerising acrylonitrile with certain N-substituted maleimides and optionally at least one other ethylenically unsaturated monomer copolymerisable using free-radical catalysts.

The novel copolymers of the present invention contain from 1–99 mole percent of acrylonitrile and from 99–1 mole percent of at least one N-aryl maleimide.

In general, the inclusion of small amounts of N-aryl maleimides to form a copolymer of acrylonitrile and N-aryl maleimide increases the solubility, the stress at which it breaks, and the ease of moulding the copolymer compared with the homopolymer of acrylonitrile. Copolymers containing at least 10 mole percent of N-aryl maleimide are mouldable or extrudable at temperatures as low as 240° C. to give transparent products. However, with large amounts of N-aryl maleimide in the copolymer, the products tend to become more brittle again and less easy to fabricate without concomitant decomposition. Those containing from 10–60 mole percent (desirably 10–25 mole percent) of N-aryl maleimide are therefore preferred.

The monomer composition of the polymerisable mixture is not necessarily the same as that of the isolated copolymer, because the reactivities of the monomers may differ and may vary differently with reaction conditions. To achieve a copolymer containing approximately from 10–25 mole percent of N-aryl maleimide residues, for example, the polymerisable mixture should comprise from 8–20 mole percent of N-aryl maleimide and from 80–92 mole percent of acrylonitrile.

According to an embodiment of the present invention we provide a soluble thermoplastic copolymer which contains as the essential components from 25–90 mole percent of acrylonitrile, from 1–25 mole percent of at least one N-aryl maleimide and from 0–70 mole percent of at least one other ethylenically unsaturated monomer copolymerisable therewith of which any alkene or diene is present in amount from 0–50 mole percent and the molar ratio of any aromatic olefin to acrylonitrile lies within the range 0.5 to 4, the quantities being chosen to total 100 mole percent and the copolymer being the product of polymerising a mixture of the monomers under conditions of free radical catalysis.

The novel copolymers are usually transparent and soluble in the usual solvents for polyacrylonitrile. They have full Vicat softening points ranging from about 115° C. to at least 250° C. The copolymers containing 10 mole percent or more of imide residues are readily mouldable materials generally having softening points of from about 115–150° C., depending on the particular imide and its concentration. However, even these preferred copolymers still tend to become more viscous while they are held for long periods of time at elevated temperatures, such as would be used for example in a moulding or extrusion operation.

According to a further embodiment of the invention, modified copolymers of acrylonitrile and N-aryl maleimide which have little or no tendency to become more viscous when molten (and are therefore more attractive as moulding and extrusion materials) comprise 1–98 mole percent of acrylonitrile, from 1–98 mole percent of at least one N-aryl maleimide and from 1–98 mole percent of at least one olefin, the quantities being chosen to total 100 mole percent. For convenience, the other ethylenically unsaturated monomer or olefin may be referred to hereinafter as the "third monomer" and the copolymers as "terpolymers" although the copolymers may, of course, be formed from more than three monomers. By maintaining the amount of each monomeric constituent between specified limits in the monomer mixture, strong moulding aterials of high softening point may be obtained. These generally have flexural strengths better than polystyrene and have full Vicat softening points that are almost invariably above about 80° C. and may approach or even exceed 160° C.

With the presence of the third monomer, the preference for a lower limit of 10 mole percent of N-aryl maleimide for the products no longer applies, substantially lower amounts being still effective in the tercopolymers. For example very attractive moulding materials have been obtained using only 5 mole percent of N-phenylmaleimide. This is quite surprising since it is known that copolymers of acrylonitrile with, for example, olefins usually have undesirably low softening points for most moulding applications.

The novel copolymers are usually transparent and soluble in the usual solvents for polyacrylonitrile and also for example in acetone, cyclohexanone and 2-chlorophenol.

The preferred ratios for the monomers in the copolymers depend upon the choice of third monomer and the properties desired in the product. The initial introduction of the third monomer into the polymerisable mixture primarily improves the flexural strength of the product but tends to affect the softening point (as shown by the full Vicar measurements) adversely. The ultimate effect of introducing the third monomer depends upon whether it replaces the acrylonitrile or the N-aryl maleimide or both. However, terpolymers cannot be obtained containing more than 50% molar of a third monomer which does not homopolymerise under free-radical catalysis, so for such monomers there is little point in using more than 50 mole percent in the polymerisation mixture (although for some it may be necessary to use more in order to obtain the desired amount in the polymer).

If the amount of third monomer in the polymerisation mixture is increased at the expense of the imide, the polymeric product tends to show an improvement in flexural strength but a drop in softening point. On the other hand, at a constant low concentration of N-aryl maleimide (for example, generally up to about 10 mole percent of N-phenyl-maleimide), increasing the amount of third monomer at the expense of the acrylonitrile again tends to reduce the softening point, but a plot of flexural strength against third monomer content passes through a maximum. For example, when 5 mole percent of N-phenyl-maleimide is used with isobutene, this occurs at a point equivalent to about 20 mole percent olefine in the monomer feed.

Mouldable products having a very desirable combination of high softening point (of the order of about 100° C. and excellent flexural strength (up to six times that of polystyrene) are formed by polymerising a mixture comprising from 1–10 mole percent of at least one N-aryl maleimide, from 10–50 mole percent of at least one third monomer (or 15–30 mole percent of olefin) and from 90–40 mole percent (or 84–60 mole percent when the third monomer is an olefin) of acrylonitrile, the quantities chosen to total 100%. Preferred polymers themselves contain from 40–90 (particularly 60–90) mole percent of acrylonitrile, from 1–15 mole percent of N-aryl maleimide and from 5–50 (particularly 5–30 mole percent when the third monomer is a olefin) mole percent of third monomer, unless the third monomer is an aromatic olefin when the molar ratio of aromatic olefin to acrylonitrile should lie within the range 0.5–4. At room temperature, many of these products yield before breaking when subjected to the conditions used for measuring their flexural strength.

The N-aryl maleimides are conveniently obtained from anilines (primary arylamines). Many different anilines are readily available and yield N-aryl maleimides that may be used as comonomers for the novel copolymers. The aryl substituent is derived from an aromatic hydrocarbon or heterocycle in which one or more of the hydrogen atoms may be replaced by other atoms or groups. Substituents containing active hydrogen atoms, however, are generally to be avoided because they may interfere with polymerisations catalysed by free radicals. The aryl groups that may be present in the N-aryl maleimides include for example, phenyl, 4-diphenyl, 1-naphthyl, all the mono- and dimethylphenyl isomers, 2,6-diethylphenyl, 2-, 3- and 4-chlorophenyl, 4-bromophenyl and other mono- and di-halophenyl isomers, 2,4,6-trichlorophenyl, 2,4,6-tribromophenyl, 4-n-butylphenyl, 2-methyl-4-n-butylphenyl, 4-benzylphenyl, 2-, 3- and 4-methoxyphenyl, 2-methoxy-5-chlorophenyl, 2-methoxy5-bromophenyl, 2,5 - dimethoxy-4-chlorophenyl, 2-, 3- and 4-ethoxyphenyl, 2,5-diethoxyphenyl, 4-phenoxyphenyl, 4-methoxycarbonylphenyl, 4-cyanophenyl, 2-, 3- and 4-nitrophenyl, and methyl-chlorophenyl (2,3-, 2,4-, 2,5- and 4,3-isomers). The N-(o-substituted phenyl) maleimides are generally less coloured than the other isomers or the unsubstituted compounds and may therefore be preferred if a relatively colourless product is desired.

The other ethylenically unsaturated monomer is any such monomer that is copolymerisable using free-radical catalysts. Such monomers usually (but not always) contain olefinic methylene groups, and include for example olefins, esters of acrylic and methacrylic acids such as methyl, ethyl, n-butyl and 2-ethylhexyl acrylates and methyl and n-butyl methacrylates, vinyl esters such as vinyl acetate, vinyl ethers such as methyl and ethyl vinyl ethers, esters of fumaric acid, and unsaturated nitriles such as methacrylonitrile, vinylidene cyanide, α-methylene-glutaronitrile, α-acetoxyacrylonitrile, α-cyanostyrene, and esters of α-cyanoacrylic acid.

Suitable olefins include alkenes such as ethylene, propylene, butene-1, isobutene, pentene-1, hexene-1, 2-methylbutene-1, 2-methylpentene-1, 4-methylpentene-1, 2,4,4-trimethylpentene-1, octene, octadecene, cyclohexene and methylenecyclohexane, dienes such as butadiene and norbornadiene, and aralkenes such as styrene, α-methyl styrene and indene. Isobutene in particular is readily available and gives copolymers having very good physical properties. In minor amounts, there may be present for example vinyl chloride, vinylidene chloride, α-chloroacrylonitrile, diallyl ether, divinyl ether and glycol dimethacrylate.

The copolymers may be formed by mixing the monomers together, preferably in a liquid diluent, and carrying out the polymerisation using the appropriate techniques for polymerisations catalysed by free radicals. This is conveniently done in aqueous suspension, although organic dispersions may be used. Temperatures of from $-20°$ C. to $+120°$ C. are generally suitable. The lower limit of temperature is set by the solidification temperature of the imide in the absence of a diluent, or by the freezing point of the diluent used or the temperature at which the reagents crystallise from solution. Increase in temperature generally yields products of reduced molecular weight, thus in practice setting the upper limit.

The polymerisation is suitably carried out by charging a vessel with water and active ingredients, purging air from the system and bringing the vessel to the required polymerisation temperature. After polymerisation has ceased, the copolymers may be isolated from the polymerisation medium, freed from residual monomers, and dried. When the third monomer is gaseous or has a high vapour pressure it may be desirable to operate the polymerisation under superatmospheric pressure, when for convenience the gaseous monomer is usually added last.

The actual amount of each constituent forming the polymerisable mixture which is intended to yield a copolymer of a given constitution depends upon the reactivity of each of the constituents when in contact with the others. For binary mixtures this may be determined readily by established techniques but for ternary or more complicated mixtures the desired amounts may be determined more quickly by experimentation.

The preferred range of reduced viscosity for the copolymers of the invention will depend to some extent upon the choice of third monomer and the ratio of monomers in the polymer. In general, those having a reduced viscosity below about 0.3 (measured on a solution of 0.5 g. of polymer in 100 cm.$^3$ of dimethylformamide at 25° C.) tend to lack the combination in physical properties desirable for moulding materials, while those of reduced viscosity above about 3 or 4 are difficult to process by currently available machinery.

The mouldable copolymers described above may be shaped by any suitable process in which the plastic is heated until it attains a relatively fluid state and is then subjected to a forming process. For instance, they may be injection-moulded, compression-moulded, or extruded and the articles so produced may be subjected to further fabrication processes if desired. For example, compression-moulded or extruded sheets may be vacuum-formed into complex three-dimensional shapes. Films and sheets may be cast from the solutions of the copolymers.

The copolymers may be mixed with additives such as thermal stabilizers, absorbers of ultraviolet light, pigments, dyes, plasticizers, fillers (e.g. glass fibres), lubricants, processing aids and mould-release agents. They may be blended if desired with other natural or synthetic polymeric materials, for example rubbers, grafts having a rubber substrate and a superstrate compatible with the copolymers, and resins (by which term we mean thermoplastic materials which are free from rubbers). Grafts having a superstrate corresponding to the copolymers of the present invention are particularly suitable, and are described and claimed in U.S. Ser. No. 539,738, now abandoned. It has been found that N-aryl maleimides may be polymerised with acrylonitrile in certain specified quantities to yield copolymers which may be formed readily into fibres whose longitudinal strength may be increased by stretching them. These materials may be formed according to the present invention by polymerising from 8 to 20 mole percent of N-aryl maleimide with from 92 to 80 mole percent of acrylonitrile to give a copolymer containing approximately 10 to 25 mol percent of N-aryl maleimides and 90 to 75 mole percent acrylonitrile. Particularly preferred fibre-forming copolymers are prepared by polymerising from 8 to 15 mole percent of N-aryl maleimide with from 92 to 85 mole percent of acrylonitrile to give a copolymer containing approximately 10 to 20 mole percent of N-aryl maleimide and 90 to 80 mole percent of acrylonitrile.

Many attempts have been made to improve the solubility, dye-receptivity, non-inflammability and thermal stability of polyacrylonitrile fibres by introducing small amounts of comonomers into the polymer chain. The copolymers of the invention provide fibre-forming materials which have good dye-receptivity and improved solubility compared with homopolymers of acrylonitrile and yet still retain surprisingly high softening points.

Modified fibre-forming materials, having improved breaking stress and a soft feel, may be obtained according to the invention by polymerising a mixture comprising 94 to 80 mole percent of acrylonitrile, from 1 to 14 (preferably 5 to 10) mole percent of N-aryl maleimide and from 1 to 14 (preferably 1 to 10) mole percent of third monomer, the quantities being chosen to total 100 mole percent.

These copolymers may be formed into fibres by any suitable process for spinning acrylonitrile polymer, such as melt-spinning, dry-spinning or wet-spinning. Spinning from solution is conveniently used because of the high melting points of the polymers. Dry spinning from a solvent is the preferred process. The drawing of the filaments so formed is generally effected at elevated temperature; they cannot be readily cold-drawn.

Homogeneous copolymers of acrylonitrile and a conjugated aromatic olefin containing not more than 50 mole percent of acrylonitrile and not more than 80 mole percent of conjugated aromatic olefin are known and may be made by simple copolymerisation of the monomers in the required proportion. Where the reaction mixture contains substantially more than 50 mole percent of acrylonitrile, the polymer initially formed will contain a proportion of aromatic olefin in excess of the proportion present in the monomer mixture. This will be at the expense of polymer formed later. Thus for a given monomer composition containing substantially more than 50 mole percent acrylonitrile the overall composition of the polymer might be the same as that of the monomer mixture, but the polymer will not be homogeneous, that formed earlier being higher in olefin than that formed later. Similarly where a monomer mixture contains more than 80 mole percent of conjugated aromatic olefin, the polymer initially formed will be proportionally richer in acrylonitrile. The intermediate range may be termed the "azeotropic" range within which the comonomers polymerise to give a copolymer containing the aromatic olefin and acrylonitrile units in substantially the same proportions as they were in the monomer mixture, thereby forming homogeneous copolymers.

Such "azeotropic" copolymers of acrylonitrile and styrene are widely used as thermoplastic resins and in the rubber-containing materials known generally as "ABS" materials.

The resins are strong and transparent, and the ABS materials are remarkably tough, but they both suffer from relatively low softening points, making ABS unsuitable for example for hot water pipes. It has been found that this deficiency may be overcome by incorporating an N-aryl maleimide into the "azeotropic" copolymers of acrylonitrile and conjugated aromatic olefin, according to the present invention.

Accordingly we provide a copolymer whose units comprise 1 to 50 mole percent of acrylonitrile, 1 to 98 mole percent of at least one conjugated aromatic olefin and 1 to 50 mole percent of at least one N-aryl maleimide and in which the molar ratio of aromatic olefin to acrylonitriles lies within the range 0.5 to 4 (preferably 1 to 4). The preferred composition range is 25 to 50 mole percent of acrylonitrile, 40 to 70 mole percent of at least one conjugated aromatic olefin and 1 to 20 mole percent of at least one N-aryl maleimide. The composition which is particularly preferred is substantially about 40 mole percent acrylonitrile, about 55 mole percent of at least one aromatic olefin and about 5 mole percent of at least one N-aryl maleimide. To distinguish from the copolymers containing alkenes described above, these copolymers containing a conjugated aromatic olefin will be referred to herein as acrylonitrile/aromatic olefin terpolymers even though more than three monomers may be used, e.g. more than one aromatic olefin may be polymerised.

The conjugated aromatic olefin is selected from those of the formula $CH_2=CRAr$, and also acenaphthylene, indene and coumarone. In this formula R is hydrogen or methyl and Ar is an optionally ring-substituted residue of aromatic character having not more than 3 rings and each substituent (if any) having not more than 4 carbon atoms. Examples of such conjugated aromatic olefins include styrene, α-ethylstyrene, o-methylstyrene, m-methylstyrene, p-methylstyrene, o-chlorostyrene, m-chlorostyrene, p-chlorostyrene, 2,5-dimethylstyrene, 1-vinylnaphthalene, ar-dibromostyrene, and N-vinylcarbazole, either singly or together with one or more such olefins. Of these the preferred conjugated aromatic olefins are styrene and α-methylstyrene. Where the use of styrene is described herein, α-methylstyrene or a mixture of the two may be used instead if desired.

This aspect of the invention has been described with reference specifically to acrylonitrile/aromatic olefin terpolymers. In all the acrylonitrile/aromatic olefin terpolymers the acrylonitrile may be replaced in part or completely by methacrylonitrile.

The acrylonitrile/aromatic olefin terpolymers may be moulded to give strong, transparent plaques. They may be mixed with additives such as thermal stabilisers, absorbers of ultraviolet light, pigments, dyes, plasticisers, fillers (e.g. glass fibres), lubricants, processing aids and mould release agents. As with styrene/acrylonitrile resins the terpolymers of this aspect of the present invention may be blended with other natural or synthetic polymeric materials. In particular they may be blended with a toughening material such as a rubber or a graft containing a rubber substrate having a superstrate compatible with the terpolymer. The invention may therefore be used for providing an ABS-like material of higher softening point.

The acrylonitrile/aromatic olefin terpolymer is not limited to use as the resin itself. By carrying out the copolymerisation in the presence of a diene rubber, a graft copolymer may be formed in which the superstrate is an acrylonitrile/aromatic olefin terpolymer according to the present invention. Thus in addition to uses as the terpolymer itself, applications include blends of terpolymer resin and ABS graft, terpolymer graft, blends of terpolymer resins and terpolymer grafts, and blends of terpolymer grafts with compatible resins. The amount by which the softening point is raised will depend on which maleimide is present in the acrylonitrile/aromatic olefin terpolymers and the proportions of it that are used. It will also depend on whether the maleimide is used in the resin, the graft superstrate, or in both the resin and graft superstrate; generally it is more effective in the resin than in the graft alone.

By the term "ABS graft" polymer we mean those comprising a substrate of a diene rubber and a superstrate of styrene and acrylonitrile in which the molar ratio of styrene/acrylonitrile lies within the range 0.5 to 4. The terpolymer grafts are those in which the superstrate also contains 1 to 25 mole percent N-aryl maleimide as described above for the acrylonitrile/aromatic olefin terpolymer.

The diene rubber contains from 40% to 100% molar of at least one conjugated 1,3-diene monomer and from 0% to 60% molar of at least one other ethylenically unsaturated monomer copolymerisable with free radical catalysts. Suitable dienes include for example butadiene, isoprene, 2,3-dimethylbutadiene, piperylene and chloroprene. A wide variety of other monomers may be used; including aralkenes such as styrene and α-methylstyrene, esters of acrylic and methacrylic acids such as methyl, ethyl, n-butyl and 2-ethylhexyl acrylates and methyl and n-butyl methacrylates, esters of fumaric acid, and unsaturated nitriles such as acrylonitrile; styrene and acrylonitrile are particularly convenient.

Graft copolymers may be made by a sequential polymerisation in which the monomers for the superstrate are polymerised by free radical catalysts in bulk or in a liquid diluent containing the substrate rubber in suspension or solution. The polymerisation is conveniently carried out in an aqueous emulsion, although suspension or bulk polymerisations may also be used, in combination if desired.

The graft copolymer thereby produced may be isolated from the polymerisation medium, freed from residual monomers, and dried. For some purposes it can then be used directly in the fabrication of shaped structures or coatings; this is particularly true of the grafts containing relatively small amounts of rubber. An important use for grafts is in blending with compatible resins so as to improve their impact resistance. A particularly suitable resin for this purpose is one made as described above for the graft but omitting the rubber.

When both the graft and the resin required for blending are available as latices (e.g. as the products of an aqueous emulsion polymerisation), the components need to be isolated but the latices can be mixed, i.e. the graft and the resin are latex-blended. After adding any required additives, e.g. stabilisers and antioxidants, the blend is then coagulated by pouring into a dilute electrolyte solution, e.g. aluminum sulphate or calcium chloride solution, and the product isolated and washed with hot water.

Alternatively the two components may be melt-blended on a mill having heated rollers, or in an extruder.

A product in many ways equivalent to a blend may also be obtained directly by adjusting the conditions of the grafting polymerisation so that some of the superstrate monomers copolymerise to give some separate resin as well as the graft; thus the graft is produced concurrently with the resin.

The toughness of the final blended composition is governed not only by the amount of rubber it contains (preferably 1% to 50% by weight) but also by the proportion of superstrate in the graft used for blending.

The grafts or their blends, mixed with any desired fillers or reinforcing materials, lubricants and stabilisers, can be used as thermoplastic raw material to make articles which require a good resistance to impact. Their toughness coupled with high strength and high softening point may thus be displayed to advantage. For example, the compositions may be extruded into sheet or tube, and the sheet can be calendered with embossing if desired or can be shaped as required e.g. by pressing, drawing or vacuum-forming. The compositions can also be compression-moulded and injection-moulded. Examples of articles that may thus be produced using the compositions of the invention include panelling and exterior casing for machinery (as in motor cars, office machines and household equipment), crash helmets, pipes for conveying fluids, and telephone receivers. The use of compositions of the invention having superior tensile strength coupled with toughness and rigidity may allow economy of material in comparison with currently used products in that thinner pieces would serve the same purpose. The advantageous physical properties of the composition may also permit them to be used in engineering applications for which plastics have not hitherto been suitable.

The acrylonitrile/aromatic olefin terpolymer or graft may similarly be blended with other compatible polymer e.g. PVC, chlorinated PVC, bisphenol A polycarbonate, or polymethylmethacrylate. Thus a tough, high-softening PVC may be produced by blending PVC with a terpolymer graft as described above.

The following examples illustrate the invention. In the examples, except where otherwise indicated, all parts are expressed as parts by weight, the reduced viscosity was measured on a solution of 0.5 g. of polymer in 100 cm.$^3$ of dimethylformamide at 25° C., the melt viscosity was measured at 260° C. at a shear rate of 1000/sec., and the flexural breaking stress and tensile yielding stress were measured at 20° C.

The flexural breaking stress was measured on specimens 51 mm. long and 12.7 mm. wide milled from a compression-moulded sheet 3 mm. thick. The specimen rested on two supports 38.1 mm. apart and midway between them a load was applied sufficient to bend the specimen at the rate of 457 mm./min. The flexural breaking stress was calculated by multiplying the load at the moment of rupture by the factor: $(1.5)(38.1)/(12.7)(3)^2=0.5$.

The tensile yielding stress was measured on specimens 76 mm. long and 14 mm. wide milled from a compression moulded sheet 3 mm. thick. The cross-sectional area across the centre of the specimen was reduced to 9 mm.$^2$ by milling two slots (radius of curvature 31 mm.) opposite each other in the long edges so that the narrowest width of the specimen was 3 mm. A tensile stress was then applied to the specimen sufficient to elongate it at the rate of 12.7 mm./min. and the stress at the yield point (or brittle fracture) was recorded.

In the notched specimen impact test, carried out at 20° C., a specimen 60 mm. long, 6.5 mm. wide and 3 mm. thick was given a 45° notch 2.5 mm. deep (tip radius not greater than 0.25 mm.) in the centre of one edge. It was supported between two supports 50 mm. apart and struck centrally on the edge opposite the notch by a pendulum dropping from 300 mm. with more than sufficient energy to break the specimen. From the residual energy of the pendulum the energy required to break the specimen was calculated and divided by the cross-sectional area of the specimen at the notch. The resulting value (expressed in joules/cm.$^2$) represents the energy required to break the material.

EXAMPLE 1

10 parts (7.1 mole percent) of N-phenylmaleimide, 40 parts (92.9 mole percent) of acrylonitrile, 0.5 part of azodiisobutyronitrile and 440 parts of dry benzene were placed in a 3 neck flask fitted with a condenser, a stirrer and a nitrogen supply and the mixture was purged well with nitrogen for 5 minutes. The temperature was then raised to 60° C. and the mixture was stirred. After 4 hours a further 0.5 part of azodiisobutyronitrile was added and then the mixture was stirred at 60° C. for 16 hours followed by 6 hours at 76–80° C. The resulting product was filtered off, washed with benzene and dried in vacuum to yield 33.6 parts of copolymer having a reduced viscosity of 0.69.

Oxygen analysis showed that the copolymer contained 22.7 weight percent (8.25 mole percent) N-phenylmaleimide. It could be compression-moulded at 200° C. to give transparent brown plaques having a one-tenth Vicat softening point of 98° C. and a full Vicat softening point of 121° C. The polymer as made showed little of the 2-dimensional crystallinity characteristic of polyacrylonitrile.

EXAMPLE 2

The process of Example 1 was repeated using an equal volume of methanol instead of benzene as the solvent. The polymerisation was effected at 60° C. and the product was filtered off, washed with methanol and dried in vacuum to yield 13.5 parts of polymer with a reduced viscosity of 0.4 and containing 16.8% by weight (5.8 mole percent) of N-phenylmaleimide. It was compression-moulded at 200° C. to give transparent brown discs with a one-tenth Vicat softening point of 110° C. However, the full Vicat softening point was above 250° C., indicating a large amount of residual two-dimension crystalline order.

EXAMPLE 3

5 parts (3.3 mole percent) of N-phenylmaleimide and 45 parts (96.7 mole percent) of acrylonitrile were dispersed in 200 parts of water containing 0.25 part of potassium persulphate in the reaction vessel described in Example 1. The vessel was then purged with nitrogen and the mixture was stirred at 60° C. under nitrogen for 24 hours. The product was filtered off, washed with water followed by methanol and dried in vacuum. 16.8 parts of a copolymer were obtained having a reduced viscosity of 3.12. It gave transparent dark brown compression mouldings with a one-tenth Vicat softening point of 172° C. and a full Vicat softening point of 213° C. It contained 24.9 weight percent (9.2 mole percent) of N-phenylmaleimide by oxygen analysis.

EXAMPLE 4

The process of Example 3 was repeated but 100 parts of water were replaced by an approximately equal volume of methanol. The polymerisation was effected at 60° C. for 4 hours after which the polymer was isolated by centrifuging, washed with water followed by methanol and dried in vacuum. 29.2 parts of a copolymer were obtained having a reduced viscosity of 3.11 and containing 28.2 weight percent (10.7 mole percent) of N-phenylmaleimide. The product was compression-moulded into transparent brown discs, having one-tenth Vicat and full Vicat softening points of 148° C. and 215° C. respectively. The copolymer showed strong polyacrylonitrile-type crystallinity as made and also after annealing from 150° C.

EXAMPLE 5

A series of copolymers were made by the process of Example 3 using in each case 50 parts of monomer, 0.25 part of potassium persulphate and 200 parts of water. 0.5 part of sodium dodecyl sulphate was added to aid dispersion. The temperature of the reaction was 60° C. and other details of polymerisation conditions and the products are set out in the table below.

| | Comonomers, parts by weight (mole percent) | | Reaction time, hours | N-phenylmaleimide in polymer, mole percent * | Yield, percent | Reduced viscosity |
|---|---|---|---|---|---|---|
| | Acrylonitrile | N-phenylmaleimide | | | | |
| A | 50 (100) | 0(0) | 24 | 0 | 79.6 | 39.1 |
| B | 47.5 (98.4) | 2.5 (1.6) | 4 | 5.4 | 91.0 | 19.0 |
| C | 45 (96.7) | 5 (3.3) | 4 | 6.45 | 85.6 | 17.0 |
| D | 40 (92.9) | 10 (7.1) | 4 | 12.0 | 63.6 | 11.1 |

* Measured by oxygen analysis.

The addition of N-phenylmaleimide was found to have a marked effect on the softening point of the products and the stress at which they underwent brittle fracture in the flexural test. This is shown in the following table.

| | Vicat softening point, °C. | | Properties of compression moulding | Flexural breaking stress, kg./mm.² | Comments |
|---|---|---|---|---|---|
| | One-tenth | Full | | | |
| A | 237 | >250 | Transparent, orange | 4.7 | Could not be extruded. |
| B | 182 | >250 | Transparent, brown | Not measured | Still showed polyacrylonitrile crystalline order. |
| C | 170 | 218±5 | Transparent, pale brown | do | Do. |
| D | 105 | 117 | do | 9.0 | Polyacrylonitrile crystalline order improved by annealing. |

EXAMPLE 6

A series of copolymers were made by the process of Example 3 using in each case 50 parts of monomer, 0.25 part of potassium persulphate, 0.25 part of sodium dodecyl sulphate, 0.5 part of dodecanethiol and 200 parts of water. The temperature of the reaction was 60° C. and the other details of polymerisation conditions and products are set out in the table below.

| | Comonomers, parts by weight (mole percent) | | Reaction time, hours | N-phenylmaleimide in polymer, mole percent * | Yield percent | Reduced viscosity |
|---|---|---|---|---|---|---|
| | Acrylonitrile | N-phenylmaleimide | | | | |
| A | 50 (100) | 0 (0) | 4 | 0 | 76.2 | 2.53 |
| B | 45 (96.7) | 5 (3.3) | 4 | 10.0 | 66.8 | 1.75 |
| C | 40 (92.9) | 10 (7.1) | 4 | 14.3 | 62.8 | 1.33 |
| D | 35 (88.4) | 15 (11.6) | 4 | 21.7 | 65.0 | 1.20 |
| E | 35 (88.4) | 15 (11.6) | 21 | 20.6 | 72.4 | 1.20 |

*Measured by oxygen analysis.

The addition of N-phenylmaleimide was again found to have a marked effect on the softening point and flexural breaking stress of the products. This is illustrated in the following table.

| | Vicat softening point, °C. | | Properties of compression moulding | Flexural breaking stress, kg./mm.² | Comments |
|---|---|---|---|---|---|
| | One-tenth | Full | | | |
| A | Not measured | | Transparent, amber | 2.9 | Highly crystalline. |
| B | 151 | 204 | Transparent, pale brown | 3.0 | Not extrudable without decomposition. Still crystalline. |
| C | 118 | 128 | do | 9.9 | Extrudable at 220° C. to yield transparent extrudate; melt viscosity increases by 60% every 5 minutes at 220° C. |
| D | 125 | 135 | do | 9.8 | Amorphous. Melt viscosity increases by 100% every 5 minutes at 220° C. |
| E | 123 | 137 | do | 11.3 | Extrudable. Melt viscosity increases by 50% every 5 minutes at 220° C. |

Comparison of B with C illustrates the very marked effect on the softening point and flexural breaking stress caused by increasing the N-phenylmaleimide content above about 10 mole percent.

EXAMPLE 7

69.2 parts (20 mole percent) of N-phenylmaleimide and 4.2 parts (40 mole percent) of acrylonitrile were dispersed in 300 parts of water in a small shaking autoclave. The water already contained 1.5 parts of potassium persulphate, 1.056 parts of sodium metabisulphite and 0.5 part of sodium dodecyl sulphate. The autoclave was successively pressurised with nitrogen to 10 kg./cm.$^2$ and vented three times. 44.8 parts (40 mole percent) of isobutene were then added and the pressure was made up to 7 kg./cm.$^2$ with nitrogen. The reactor was then shaken at 30° C. for 5 hours and vented. The resulting emulsion was coagulated by the addition of a small amount of saturated aluminium sulphate solution and the precipitated polymer was isolated by centrifuging. It was then washed twice with hot water and once with ethanol, extracted with ether and finally dried in vacuum. 98.2 parts of a copolymer were obtained having a reduced viscosity of 0.94. It had a melt viscosity of $16 \times 10^3$ poises which did not increase with time. It was compression-moulded at 250° C. to give transparent amber plaques having one-tenth and full Vicat softening points of 154° C. and 164° C. respectively. The flexural breaking stress was 3.3 kg./mm.$^2$

EXAMPLE 8

The process of Example 7 was repeated using 34.6 parts (10 mole percent) of N-phenylmaleimide, 42.4 parts (40 mole percent) of acrylonitrile, 56 parts (50 mole percent) of isobutene, 1.5 parts of potassium persulphate, 1.056 parts of sodium metabisulphite, and 0.667 part of sodium dodecyl sulphate in 400 parts of water. The polymerisation was effected at 30° C. for 4 hours in a shaking autoclave and the product was worked up as described in Example 7 to yield 70.1 parts of a copolymer having a reduced viscosity of 1.0. It had a melt viscosity of $13 \times 10^3$ poises which did not increase with time. The tercopolymer was compression-moulded at 250° C. to give transparent amber discs having one-tenth and full Vicat softening points of 132° C. and 144° C. respectively. The flexural breaking stress was 6.8 kg./mm.$^2$.

EXAMPLE 9

The process of Example 7 was repeated using 34.6 parts (10 mole percent) of N-phenylmaleimide, 42.4 parts (40 mole percent) of acrylonitrile, 84 parts (50 mole percent) of 2-methylpentene-1, 1.5 parts of potassium persulphate, 1.056 parts of sodium metabisulphite and 0.667 part of sodium dodecyl sulphate in 400 parts of water. The process and working-up-procedure were as described in Example 7 and the yield was 51.5 parts of a copolymer having a reduced viscosity of 0.85 and containing 29 mole percent of N-phenylmaleimide, 52 mole percent of acrylonitrile and 19 mole percent of 2-methylpentene-1, based on infrared analysis. It had a melt viscosity of $14 \times 10^3$ poises which did not increase with time. The polymer was compression-moulded to give transparent amber mouldings with one-tenth and full Vicat softening points of 150° C. and 160° C. respectively. The flexural breaking stress was 9.7 kg./mm.$^2$.

EXAMPLE 10

The process of Example 7 was repeated using 34.6 parts (6.7 mole percent) of N-phenylmaleimide, 42.4 parts (26.7 mole percent) of acrylonitrile, 112 parts (66.7 mole percent) of isobutene, 1.5 parts of potassium persulphate, 1.056 parts of sodium metabisulphite and 0.667 part of sodium dodecyl sulphate in 400 parts of water. The polymerisation and work-up procedure were as described in Example 7 and 74.2 parts of copolymer were obtained having a reduced viscosity of 0.84. Its melt viscosity was $8.5 \times 10^3$ poises and this did not increase with time. The tercopolymer was compression-moulded to give transparent amber compression mouldings having one-tenth and full Vicat softening points of 132° C. and 143° C. The flexural breaking stress was 6.7 kg./mm.$^2$.

EXAMPLE 11

The process of Example 7 was repeated using 34.6 parts (10 mole percent) of N-phenylmaleimide, 53 parts (50 mole percent) of acrylonitrile, 44.8 parts (40 mole percent) of isobutene, 1.5 parts of potassium persulphate, 1.056 parts of sodium metabisulphite and 0.667 part of sodium dodecyl sulphate in 400 parts of water. The polymerisation and working-up procedure were as described in Example 7 and 89.3 parts of copolymer were obtained, having a reduced viscosity of 0.9. Its melt viscosity was $8.0 \times 10^3$ poises and this did not increase with time. The tercopolymer was compression-moulded to give transparent pale yellow mouldings having one-tenth and full Vicat softening points of 122° C. and 132° C. respectively. A sample of the moulding was found to break at 8.2 kg./mm.$^2$ in the flexural test.

EXAMPLE 12

The process of Example 11 was repeated using 34.6 parts (10 mole percent) of N-phenylmaleimide, 74.2 parts (70 mole percent) of acrylonitrile and 22.4 parts (20 mole percent) of isobutene. After polymerisation, purification, washing and drying, 115.6 parts of copolymer were obtained having a reduced viscosity of 1.11 and containing 10 mole percent of N-phenylmaleimide, 73 mole percent of acrylonitrile and 17 mole percent of isobutene, based on infrared analysis. Its melt viscosity was $8.5 \times 10^3$ poises and this did not increase with time. It was compression-moulded to give transparent amber samples having one-tenth and full Vicat softening points of 119° C. and 132° C. respectively. The flexural breaking stress was 11.1 kg./mm.$^2$.

EXAMPLE 12

The process of Example 11 was repeated using 17.3 parts (5 mole percent of N-phenylmaleimide, 79.5 parts (75 mole percent of acrylonitrile and 22.4 parts (20 mole percent is isobutene, 98 parts of coploymer were obtained having a reduced viscosity of 2.14. Its melt viscosity was $12 \times 10^3$ poises and did not increase with time. Transparent, pale yellow compression mouldings were obtained having one-tenth and full Vicat softening points of 92° C. and 109° C. respectively, and a flexural breaking stress of 17.4 kg./mm.$^2$.

EXAMPLE 14

The process of Example 11 was repeated using 20.75 parts (5 mole percent) of N-2-chlorophenylmaleimide, 79.5 parts (75 mole percent) of acrylonitrile and 22.4 parts (20 mole percent) of isobutene. 105 parts of copolymer were obtained having a reduced viscosity of 1.76 and a melt viscosity of $9.5 \times 10^3$ poises. Transparent, almost colourless mouldings were obtained having one-tenth and full Vicat softening points of 100° C. and 109° C. respectively, and a flexural breaking stress of 17.1 kg./mm.$^2$.

EXAMPLE 15

The process of Example 7 was followed, using dodecanethiol as a chain transfer agent in the polymerisation mixture. 17.3 parts (5 mole percent) of N-phenylmaleimide, 79.5 parts (75 mole percent) of acrylonitrile, 1.5 parts of potassium persulphate, 1.056 parts of sodium metabisulphite, 1.29 parts of dodecanethiol, 0.667 part of sodium dodecyl sulphate and 400 parts of water were placed in a small shaking autoclave which was then pressurised to 8 kg./cm.$^2$ with nitrogen and vented three times. 22.4 parts (20 mole percent) of isobutene were then added and the pressure brought to 4.5 kg./cm.$^2$ with nitrogen. The mixture was shaken at 30° C. for 4.5 hours before releasing the pressure. The resulting latex was coagulated of the addition of saturated aluminium sulphate solution and the precipitated material was filtered, washed three times with hot water and twice with methanol and dried in vacuum to yield 92 parts of copolymer having a reduced viscosity of 0.99. A sample of the polymer was compression-moulded at 200° C. to yield very pale yellow transparent plaques having a full Vicat softening point of 102° C., a flexural breaking stress of 17.3 kg./mm.$^2$ and a melt viscosity of $5.7 \times 10^3$ poises. The melt viscosity was unchanged after 5 minutes at 260° C. indicating that the polymer was wholly amorphous.

EXAMPLE 16

The process of Example 15 was repeated but with the exclusion of the sodium metabisulphite and the dodecanethiol and the mixture was shaken at 60° C. for 3 hours. The latex was coagulated and the solid product worked up as described in the previous example to yield 89 parts of copolymer having a reduced viscosity of 2.48. Compression moulding produced pale yellow plaques having a full Vicat softening point of 103° C.

EXAMPLE 17

The process of Example 15 was repeated but in this case the pH of the medium was adjusted to 3–4 by the addition of 0.1 N sulphuric acid prior to polymerisation. 102.5 parts of copolymer were obtained having a reduced viscosity of 0.84; plaques moulded from the copolymer showed a full Vicat softening point of 101° C. and a flexural breaking stress of 17.4 kg./mm.$^2$.

EXAMPLE 18

A series of polymerisations were carried out to show the effect of varying the amount of acrylonitrile and olefin in the monomer mixture. Each polymerisation was effected in 400 parts of water containing 3 parts of potassium persulphate, 2.1 parts of sodium metabisulphite, 0.7 part of sodium dodecyl sulphate and 1.29 parts of dodecanethiol. The amount of each monomer used in each of the polymerisations, together with the yield of polymer, its reduced viscosity, its Vicat softening point, its flexural breaking stress and other comments are set out in the following table.

dodecanethiol. After coagulating the latex and working-up the solid product, 89.1 parts of copolymer were obtained having a reduced viscosity of 1.14. Nitrogen analysis indicated that it contained 79 mole percent of acrylonitrile and 21 mole percent of isobutene. Plaques compression-moulded from the copolymer at 200° C. were transparent and yellow in colour and while they had a usefully high flexural breaking stress of the order of 11.9 kg./mm.$^2$ their full Vicat softening point was low at 85° C. Comparison of this copolymer with products D and E of Example 18 show the marked drop in Vicat softening point that occurs when the N-phenylmaleimide is omitted.

EXAMPLE 19

The process of Example 18 was repeated but in this case the amount of N-phenylmaleimide was increased at the expense of olefin in the monomer mixture. The amount of dodecanethiol was reduced to 1.21 parts. The monomer mixture comprised 25.95 parts (7.5 mole percent) of N-phenylmaleimide, 74.2 parts (70 mole percent) of acrylonitrile and 25.2 parts (22.5 mole percent) of isobutene. 110.5 parts of copolymer were obtained having a reduced viscosity of 0.84. It was moulded at 200° C. to yield a pale yellow plaque with a Vicat softening point of 106° C. and a flexural breaking stress of 11.4 kg./mm.$^2$. Comparison of this example with that prepared by process B of Example 18 indicates the effect on Vicat softening point of increasing the amount of N-phenylmaleimide at the expense of isobutene; the flexural breaking stress is not markedly inferior in this case. The beneficial effect on Vicat softening point of adding still more N-phenylmaleimide is shown by Example 12 where, however, an adverse effect on flexural breaking stress is also apparent.

EXAMPLE 20

Using the process of Example 15, 34.6 parts (10 mole percent) of N-phenylmaleimide, 42.4 parts (40 mole percent) of acrylonitrile and 56 parts (50 mole percent) of isobutene were shaken at 60° C. in 300 parts of water containing 0.5 part of potassium persulphate and 0.5 part of sodium dodecyl sulphate. 52.9 parts of copolymer

| | A | B | C |
|---|---|---|---|
| Comonomers and amounts, parts by weight (mole percent): | | | |
| N-phenylmaleimide | 17.3 (5) | 17.3 (5) | 17.3 (5). |
| Acrylonitrile | 68.9 (65) | 74.2 (70) | 79.5 (75). |
| Olefine (isobutene) | 33.6 (30) | 28 (25) | 22.4 (20). |
| Yield of polymer, parts | 99.3 | 101.4 | 80.5. |
| Reduced viscosity | 0.80 | 0.84 | 0.97. |
| Polymeric composition, mole percent: | | | |
| N-phenylmaleimide | 6 | 6 | 6. |
| Acrylonitrile | 70 | 71 | 74. |
| Isobutene | 24 | 23 | 20. |
| Full Vicat softening point, °C | 98 | 97 | 102. |
| Flexural breaking stress, kg./mm.$^2$ | 9.6 | 12.6 | 15.2. |
| Crystalline order | Amorphous as made and when annealed at 200° C. | Amorphous as made and when annealed at 200° C. | Amorphous as made and when annealed at 200° C. |
| Colour of moulding | Yellow | Yellow | Very pale yellow. |

| | D | E | F |
|---|---|---|---|
| Comonomers and amounts, parts by weight (mole percent): | | | |
| N-phenylmaleimide | 17.3 (5) | 17.3 (5) | 17.3 (5). |
| Acrylonitrile | 84.8 (80) | 90.1 (85) | 95.4 (90). |
| Olefine (isobutene) | 16.8 (15) | 11.2 (10) | 5.6 (5). |
| Yield of polymer, parts | 104.0 | 102.9 | 103.4. |
| Reduced viscosity | 0.88 | 1.04 | 1.08. |
| Polymeric composition, mole percent: | | | |
| N-phenylmaleimide | 5 | 6 | 5. |
| Acrylonitrile | 77 | 83 | 87. |
| Isobutene | 18 | 11 | 8. |
| Full Vicat softening point, °C | 100 | 126 | 162. |
| Flexural breaking stress, kg./mm.$^2$ | 14.9 | 9.8 | 9.8. |
| Crystalline order | Amorphous as made but developed low 2-dimensional order on annealing at 200° C. | Showed low 2-dimensional order as made which increased considerably on annealing. | Showed moderate 2-dimensional order as made which increased considerably on annealing. |
| Colour of moulding | Yellow | Deep yellow | Deep yellow. |

REFERENCE EXAMPLE

The process of Example 18 was repeated using 79.5 parts (75 mole percent) of acrylonitrile and 28 parts (25 mole percent) of isobutene only and in the absence of were obtained having a reduced viscosity of 0.87. It was moulded to give transparent plaques which were pale brown in colour, had a full Vicat softening point of 141° C. and a flexural breaking stress of 11.2 kg./mm.$^2$.

EXAMPLE 21

Tthe process of Example 15 was repeated using 0.6 part of dodecanethiol. The polymerisation was effected for 4 hours at a temperature of 29–32° C. After precipitating, filtering, washing and drying as usual, 94.7 parts of a copolymer were obtained having a reduced viscosity of 1.27, and containing 73 mole percent of acrylonitrile, 20 mole percent of isobutene and 7 mole percent of N - phenylmaleimide. Plaques were compression-moulded from the copolymer at 200° C. to give slightly hazed, very pale yellow, transparent mouldings having a flexural breaking stress of 17.0 kg./mm.$^2$ and a full Vicat softening point of 103° C.

By way of comparison the process was repeated using double the amount of catalyst, i.e. 3.0 parts of potassium persulphate and 2.1 parts of sodium metabisulphite; in all other respects the process was the same. Polymerisation was effected for 4 hours at a temperature of 29–37° C. In this case, 105.4 parts of copolymer were obtained having a reduced viscosity of 0.91. Plaques compression-moulded at 200° C. from this material were transparent and amber in colour but showed a flexural breaking stress of only 10.8 kg./mm.$^2$ at 20° C.

EXAMPLE 22

2800 parts of water containing 4.17 parts by weight of dodecanethiol, 10.5 parts of potassium persulphate, 7.35 parts of sodium metabisulphite and 4.9 parts of sodium dodecyl sulphate were charged to an autoclave, together with 121.8 parts (5 mole percent) of N-phenylmaleimide and 556.5 parts (75 mole percent) of acrylonitrile. The autoclave was then purged with nitrogen and vented as described in Example 15, and then 156.8 parts (20 mole percent) of isobutene were added and the pressure raised to 4.5 kg./mm.$^2$ with nitrogen. Reaction was effected for 4.33 hours at a temperature of 22–42° C. before the autoclave was vented and the latex coagulated. After working up as described in Example 15, 760.3 parts were obtained of a copolymer having a reduced viscosity of 1.08, and containing 73 mole percent of acrylonitrile, 21 mole percent of isobutene and 6 mole percent of N-phenylmaleimide. The polymer was compression-moulded at 200° C. to give yellow transparent plaques having a flexural breaking stress of 15.2 kg./mm.$^2$.

By way of comparison the experiment was repeated under identical conditions except that the amount of catalyst was reduced to 8.34 parts of potassium persulphate and 5.84 parts of sodium metabisulphite. In this process the temperature of the polymerisation was controlled to close limits and varied between 29.9 and 31.9° C. during the 4.33 hours of the reaction. After working up as described in Example 15, 611.6 parts were obtained of a copolymer having a reduced viscosity of 1.70, and containing 74 mole percent of acrylonitrile, 19 mole percent of isobutene and 7 mole percent of N-phenylmaleimide. Plaques compression-moulded from this copolymer were too tough to break in the flexural test at 20° C. and showed a tensile yielding stress of 10.8 kg./mm.$^2$.

EXAMPLE 23

The process of Example 22 was repeated but in this case the catalyst comprised 5.25 parts of potassium persulphate and 3.67 parts of sodium metabisulphite. Polymerisation was effected at a temperature of 30.0–30.8° C. for 6 hours. After working up as described in Example 15 443.7 parts were obtained of a copolymer having a reduced viscosity of 2.21, and containing 73 mole percent of acrylonitrile, 19 mole percent of isobutene and 8 mole percent of N-phenylmaleimide. This was compression-moulded at 200° C. to give pale yellow, transparent plaques having a flexural breaking stress of 17.8 kg./mm.$^2$ and a tensile yielding stress of 11.3 kg./mm.$^2$.

EXAMPLE 24

In this example several polymerisations were effected, each using the process of Example 22. In each case the amount of catalyst was constant at 8.34 parts of potassium persulphate and 5.84 parts of sodium metabisulphite but the amount and nature of the chain transfer agent were varied. The results are set out in the following table, where A is the product already described in Example 22.

| | Chain transfer agent (parts by weight) | Yield of copolymer, percent | Reduced viscosity | Polymer composition (mole percent) | | | Colour of moulding | Full Vicat softening point, °C. | Flexural breaking stress, kg./mm.$^2$ |
| --- | --- | --- | --- | --- | --- | --- | --- | --- | --- |
| | | | | Acrylonitrile | N-phenyl-maleimide | Iso-butene | | | |
| A | Dodecanethiol (4.17) | 73 | 1.70 | 74 | 7 | 19 | Pale yellow transparent | (1) | (2) |
| B | Dodecanethiol (8.35) | 82.3 | 1.48 | Not analysed | | | do | (1) | (1) |
| C | Thioglycollic acid (4.17) | 80 | 1.45 | 73 | 6 | 21 | Amber transparent | 102 | 17.5 |
| D | Thioglycollic acid (8.35) | 86.5 | 1.88 | 73 | 6 | 21 | do | (1) | 17.7 |
| E | Octanethiol (4.17) | 73.2 | 0.91 | 72 | 7 | 21 | Pale yellow transparent | 109 | 16.7 |
| F | Octanethiol (5.00) | (1) | 0.74 | 72 | 8 | 20 | do | (1) | 17.2 |
| G | Octanethiol (5.83) | 79.2 | 0.7 | 71 | 8 | 21 | Very pale yellow transp | 105 | 12.5 |
| H | Octanethiol (6.68) | 75 | 0.68 | 73 | 6 | 21 | Yellow transparent | 105 | 15.8 |

$^1$ Not measurable.
$^2$ Too tough to test.

EXAMPLE 25

The process of Example 24(E) was repeated with the N-phenylmaleimide replaced by 145.25 parts (5 mole percent) of N-2-chlorophenylmaleimide. A copolymer was obtained in 68.4% yield and having a reduced viscosity of 0.87. It could be compression-moulded to give very pale yellow, transparent plaques. It had a full Vicat softening point of 104° C. and a flexural breaking stress of 17.9 kg./mm.$^2$.

EXAMPLE 26

N-2-chlorophenylmaleimide (20.75 g., 5 mole percent, acrylonitrile (99.7 cm.$^3$, 75 mole percent) and propylene (27.6 cm.$^3$, 20 mole percent) were copolymerized by the process of Example 7 using potassium persulphate (1.5 g.), sodium metabisulphite (1.056 g.), sodium dodecyl sulphate (0.667 g.) and water (400 cm.$^3$) in a shaking autoclave at 30° C. The product (82.6 g., 70% yield) was isolated as described in Example 7 and had a reduced viscosity of 1.50. On compression-moulding at 200° C. it produced transparent yellow plaques having one-tenth and full Vicat softening points of 111° C. and 127° C. respectively. The flexural breaking stress was 12.2 kg./mm.$^2$.

EXAMPLE 27

The process of Example 26 was repeated on the same scale using ethylene gas at 10.8 kg./cm.$^2$ in 740 cm.$^3$ working volume (20 mole percent) instead of propllene. The isolated product (74.0 g., 66% yield) had a reduced viscosity of 6.25. On compression-moulding at 200° C. it produced transparent amber plaques having a one-tenth Vicat softening point of 122° C. The flexural breaking stress was 6.1 kg./mm.$^2$.

EXAMPLE 28

N-phenylmaleimide (17.3 g., 5 mole percent), acrylonitrile (99.7 cm.$^3$, 75 mole percent) and styrene (46 cm.$^3$, 20 mole percent) were copolymerised as described in Example 26. The reaction was extremely rapid to give a solid polymer which was isolated (129 g., 93.5% yield).

EXAMPLE 29

A copolymer containing 6 mole percent of N-phenylmaleimide 75 mole percent of acrylonitrile and 19 mole percent of isobutene, which had a softening point above 100° C. and flexural breaking stress of 18 kg./mm.$^2$, was blended on a steam-heated mill with a variety of rubbers. The nature of the rubbers, of which 35 g. was blended with 100 g. of tercopolymer, and the softening points of the blends obtained are shown in the following table.

| Rubber | Vicat softening point | |
|---|---|---|
| | One-tenth, ° C. | Full, ° C. |
| Acrylonitrile/butadiene (33:67 mole percent) | 101 | 108 |
| Butadiene/methyl methacrylate (75:25 mole percent) | 104 | 110 |
| Ethylene/ethyl acrylate (60:40 mole percent) | 97 | 109 |
| Butyl rubber | 101 | 108 |
| Ethylene/vinyl acetate (55:45 mole percent) | 103 | 110 |
| Polyethyl acrylate | 95 | 105 |
| Acrylonitrile/butyl acrylate (13:87 mole percent) | 98 | 106 |

Blends were similarly made with the following rubbers, using 42 g. per 100 g. of tercopolymer:

(a) nitrile rubber containing a number of carboxy groups;
(b) acrylonitrile/butyl acrylate (20:80 mole percent);
(c) acrylonitrile/butadiene (40:60 mole percent), cross-linked;
(d) neoprene;
(e) polybutadiene cross-linked with 1% diviyl benzene; and
(f) ethylene/methyl methacrylate (48:52 mole percent).

EXAMPLE 30

The latex of a copolymer of 5 mole percent of N-phenylmaleimide, 75 mole percent of acrylonitrile and 20 mole percent of isobutene was mixed with amounts of an acrylonitrile/butadine (46:54 mole percent) rubber latex and the resulting latex blends were worked up to give products containing 5%, 10%, 15% and 20% by weight of rubber which were compression-moulded and showed full Vicat softening points of 111° C., 112° C., 108° C. and 107° C. respectively.

EXAMPLE 31

A sample of product F of Example 24 was dissolved in dimethyl formamide to yield a 12% solution. This solution was extruded through a filter to a spinneret through which is passed downwards into a heated air chamber maintained at about 60° C. to evaporate the solvent. The spun filament was collected on a rotating bobbin placed below the bottom of the chamber. The yarn so produced was slightly discoloured and still contained some solvent. Its tenacity could be increased by drawing at a temperature of about 110-130° C.

EXAMPLE 32

A sample of a copolymer of 5 mole percent of N-phenylmaleimide, 75 mole percent of acrylonitrile and 20 mole percent of isobutene, having a reduced viscosity of 0.96 and a full Vicat softening point of 105° C., was injection-moulded at 280-285° C. in a single-screw pre-plasticising injection-moulding machine to give plaques 11.4 cm. in diameter and 0.32 cm. thick. The plaques con-formed to the shape of the mould and were found to have a reduced viscosity of 0.93 and a full Vicat softening point of 108° C.

EXAMPLE 33

A series of terpolymer resins of acrylonitrile, styrene and N-o-chlorophenyl maleimide was prepared, and these terpolymers were subsequently blended with a commercial graft copolymer.

Resin 1.—Acrylonitrile (42.8 g., 0.8 mole), styrene (107.3 g., 1.05 moles), N-o-chlorophenyl maleimide (16.5 g., 0.08 mole), sodium lauryl sulphate (5 g.), and mixed tertiary mercaptans (0.3 cm.$^3$) were dispersed in water (800 cm.$^3$), and the system put under nitrogen. The reaction was initiated at 28° C. by adding 5% ammonium persulphate (30 cm.$^3$) and 5% sodium metabisulphite (30 cm.$^3$) solutions to the vessel. An equal quantity of monomers, that is acrylonitrile (42.8 g.), styrene (107.3 g.), and N-o-chlorophenyl maleimide (16.5 g.), were added to the reacting mixture over a period of ½ hour. The reaction temperature was maintained at about 33° C. by addition of 0.1% sodium dimethyl dithiocarbamate solution, and the reaction short stopped with 5% sodium dimethyl dithiocarbamate solution (6 cm.$^3$) at about 70% conversion.

The resulting latex was coagulated into ethanol (1.5 dm.$^3$) at 50° C., filtered, washed with water, and dried in vacuum. Yield was 224 g. of teroplymer having a reduced viscosity of 4.8. On compression moulding at 200° C., the terpolymer gave a transparent plaque having a Vicat softening point=126.8°.

For comparison the softening point of a styrene/acrylonitrile copolymer containing 64.5 moles percent styrene was 106° C.

Resin 2.—The above process was repeated but n-octyl mercaptan (2.5 cm.$^3$) were used in place of the mixed teritary mercaptans. Polymerisation was initiated with 5% ammonium persulphate solution (24 cm.$^3$), 5% sodium metabisulphite solution (24 cm.$^3$), and the reaction stopped at about 80% conversion. Yield was 275 g. and the reduced viscosity was 0.39. The terpolymer produced transparent mouldings.

Resin 3.—The process used for resin 1 was repeated using n-octyl mercaptan (1 cm.$^3$) in place of the mixed tertiary mercaptans. The reaction was initiated with 5% ammonium persulphate solution (15 cm.$^3$) and 5% sodium metabisulphite solution (15 cm.$^3$) and the second portion of the monomer added over the first 45 minutes of the reaction. Polymerisation was stopped at about 80% conversion, and the yield was 281 g. Transparent mouldings were produced from a terpolymer having a reduced viscosity of 0.79.

Resin 4.—The process used for resin 3 was repeated using only 0.5 cm.$^3$ of n-octyl mercaptan; 34 cm.$^3$ of activator solutions were used. The polymerisation was stopped when the reaction temperature began to fall, which was at about 90% conversion. Yield was 297.0 g., and the reduced viscosity was 1.12.

Resins 1 to 4 were blended with a commercial graft polymer Blendex[1] 301 comprising about 50 weight percent (60 mole percent) butadiene, 35 weight percent (22 mole percent) styrene and 15 weight percent (18 mole perzcent) acrylonitrile. The proportions are shown in the table below. Blends 1 and 2 were prepared by powder blending the resin and graft materials, and extruding at 200° C. with a screw speed of 80 r.p.m. in an extruder. The resulting lace was cut up and compression moulded at 200° C. to give opaque plaques.

| Blend | Resin used | Ratio by weight resin/graft | Vicat softening point, ° C. | | Yield stress | | Notched impact strength | |
|---|---|---|---|---|---|---|---|---|
| | | | 1/10 | Full | 10$^3$ p.s.i. | Kg.f./mm.$^2$ | Lb./in. | J./cm.$^2$ |
| 1 | 1 | 50/50 | 105 | 116.4 | 5.5 | 3.9 | 67 | 1.17 |
| 2 | 2 | 50/50 | 107 | 115 | Brittle | Brittle | | |
| 3 | 3 | 50/50 | 107.6 | 116.2 | 5.8 | 4.1 | 59 | 1.03 |
| 4 | 3 | 75/25 | 117 | 124.4 | 8.5 | 6.0 | 24 | 0.42 |
| 5 | 4 | 50/50 | 109.6 | 118 | 5.5 | 3.9 | 64 | 1.12 |

To produce blends 3–5, the resin and graft material were mixed then blended on a steam-heated 6 x 2 inch (15.2 x 5.1 cm.) mill at 170–180° C. for 5 minutes. The resultant crepe was compression moulded at 200° C. as before.

The results of physical tests on the blends are shown above.

[1] See footnote at bottom of col. 24.

EXAMPLE 34

A graft copolymer containing acrylonitrile, styrene and N-o-chlorophenyl maleimide in the grafted phase was prepared using a commercial polybutadiene latex, Firestone FR-S 2004,[1] containing 61% solids. A mixture of the latex (181 g.), sodium hydroxide (0.1 g.) and water (374 cm.$^3$) were placed in a 2 dm.$^3$ polymerisation vessel equipped with a stirrer and the air replaced by nitrogen. The catalyst, potassium peroxydisulphate (1.0 g.) was added to the latex mixture and the temperature raised to 63° C. While maintaining the temperature substantially constant a mixture of acrylonitrile (32 g.), styrene (68.0 g.) and N-o-chlorophenyl maleimide (10 g.) together with an emulsifier comprising the sodium salt of a disproportionated resin acid (4.0 g.), sodium hydroxide (0.12 g.) and water (62.0 cm.$^3$) was added to the reaction mixture over a period of 2 hours. After a further 40 minutes sodium formaldehyde sulphoxylate (0.6 g. in 20 cm.$^3$ of water) was added and the mixture allowed to cool. After standing overnight, coagulation was achieved by the addition of 10% acetic acid. The mixture was heated to 90° C. to increase the particle size, reslurried and 2,6-ditertiarybutyl 4-methyl phenol (11 g.) and dilauryl thiodipropionate (5.5 g.) in the form of 30% suspensions were added as stabilisers. Acetic acid (10%, 20 cm.$^3$) was added and the mixture filtered. The residue was washed with water, and dried in a vacuum oven at 40° C. to give a yield of 220 g.

EXAMPLE 35

The method of Example 34 was used to prepare a graft copolymer using a commercially available polybutadiene latex (Polysar [1] 710) containing 63% solids in water (888 cm.$^3$) with sodium hydroxide (0.2 g.) added. The emulsifier solution contained the sodium salt of a disproportionated rosin acid (8.0 g.) and sodium hydroxide (0.24 g.) in water (124 cm.$^3$). The catalyst was potassium peroxydisulphate (2.0 g.). The monomer mixture contained acrylonitrile (64 g.), styrene (136 g.) and N-o-chlorophenyl maleimide (20 g.), and this mixture was added over a period of 3½ hours. After a further 2½ hours the heating and stirring were stopped and sodium formaldehyde sulphoxylate (1.2 g. in 20 cm.$^3$ water) was added. The polymer was isolated as before and stabilised using 2,6-ditertiarybutyl 4-methyl phenol (22 g. as 30% suspension) and dilaurylthiodipropionate (11 g. as 30% suspension). The yield was 390 g. of graft copolymer.

EXAMPLE 36

A series of blends of a number of graft copolymers and resins identified below was prepared by melt blending on a mill having 6 in. (15.2 cm.) x 2 in. (5.1 cm.) rolls at 170° C. and milled for approximately 5 minutes. The resulting crepe was cut into small pieces and compression moulded at 200° C. to give 6 in. (15.2 cm.) x 4 in. (10.2 cm.) x ⅛ in. (0.32 cm.) plaques. The blends were as follows.

Blend 1.—Polyvinyl chloride and terpolymer graft as prepared in Example 35, in the ratio 80:20.

Blend 2.—Diakon [1] polymethyl methacrylate and terpolymer graft as prepared in Example 35 in the ratio 50:50.

Blend 3.—Commercial styrene/acrylonitrile copolymer (Tyril [1] 767) having approximate molar ratio of 70/30 respectively, and terpolymer graft as prepared in Example 35 in the ratio 50:50.

Blend 4.—Tyril [1] 767 and Blendex[1] 301 ABS graft in the ratio 50:50.

Blend 5.—Terpolymer of acrylonitrile α-methyl styrene and N-o-chlorophenyl maleimide prepared from monomers in the molar ratio 47/48.5/4.5 respectively having a reduced viscosity of 0.67, with terpolymer graft as prepared in Example 35 in the ratio 50:50.

Blend 6.—Terpolymer as used in Blend 5 with Blendex [1] 301 ABS graft in the ratio 50:50.

Blend 7.—Terpolymer of acrylonitrile, styrene and N-o-chlorophenyl maleimide as prepared in Example 33 resin 3, with terpolymer graft as prepared in Example 35 in the ratio 50:50.

Blend 8.—Bisphenol A polycarbonate and terpolymer graft as prepared in Example 35 in the ratio 75:25.

To blends 4 and 6, 2,6-ditertiarybutyl 4-methyl phenol (1 g.) and dilaurylthiodipropionate (0.5 g.) were added to stabilise the composition.

The compression moulded plaques were used for the physical tests, the results of which are shown in the following table.

| Blend | Vicat softening point ° C. | | Yield stress | | Notched impact strength | |
|---|---|---|---|---|---|---|
| | ⅒ | Full | 10³ p.s.i. | Kg.f./mm.² | Lb./in. | J./cm. |
| 1 | 82.8 | 87.6 | 5.5 | 4.3 | 234.4 | 4.10 |
| 2 | 99.4 | 109.0 | 4.7 | 3.8 | 87.6 | 1.53 |
| 3 | 98.8 | 104.2 | 3.7 | 2.9 | 178.8 | 3.13 |
| 4 | 98.4 | 104.4 | 6.3 | 4.9 | 48.0 | 0.84 |
| 5 | 122.6 | 133.0 | 4.4 | 3.4 | 154.8 | 2.70 |
| 6 | 113.6 | 127.5 | 6.7 | 5.2 | 60.0 | 1.05 |
| 7 | 112.6 | 120.0 | 4.6 | 3.6 | 165.6 | 2.89 |
| 8 | 128 | 137.4 | 6.3 | 4.9 | 128.4 | 2.26 |

EXAMPLE 37

Three blends were prepared using the terpolymer graft of Example 34 and resins as identified below. A ratio of 45.45 part by weight of graft to 54.55 parts by weight of resin was used in each case. The constituents were melt blended on a mill having heated 6 in. (15.2 cm.) x 2 in. (5.1 cm.) rolls at 185° C., the resulting crepe being cut into small pieces and compression moulded at 200° C. for mechanical testing.

The resins used in the blends were as follows.

Blend 1.—Terpolymer of acrylonitrile, α-methyl styrene and N-o-chlorophenyl maleimide prepared from monomers having a molar ratio 47/48.5/4.5 respectively, and having a reduced viscosity of 0.67.

Blend 2.—A mixture comprising (i) 45 g. of a terpolymer prepared according to Example 33 resin 3, and (ii) 10 g. of a terpolymer prepared according to Example 33 resin 4.

Blend 3.—Tyril [1] 767.

The results of the mechanical testing were as follows.

| Blend | Vicat softening point ° C. | | Yield stress | | Notched impact strength | |
|---|---|---|---|---|---|---|
| | ⅒ | Full | 10³ p.s.i. | Kg.f./mm.² | Lb./in. | J./cm. |
| 1 | 122.4 | 130.0 | 5.6 | 3.9 | 91.2 | 1.60 |
| 2 | 107.8 | 115.2 | 5.1 | 3.6 | 87.6 | 1.53 |
| 3 | 94.6 | 102.0 | 5.0 | 3.5 | 98.4 | 1.72 |

EXAMPLE 38

N-phenymaleimide (17.3 g.; 5 mole percent), acrylonitrile (70.2 g.; 65 mole percent), vinyl acetate (51.7 g.; 30 mole percent, potassium persulphate (1.5 g.), sodium metabisulphite (1.05 g.), sodium dodecyl sulphate (0.7 g.) and water 400 g.) were placed in a shaking autoclave which was then pressurised to 7 kg./cm.² with nitrogen and vented three times. The polymerisation proceeded for 4 hours at 30° C. with shaking under nitrogen at about 4 kg./cm.². The pressure was then released and the resultant latex was coagulated by the addition of saturated aluminium sulphate solution. The precipitate was filtered off, washed three times with hot water and twice with ethanol and dried in vacuum at 70° C. to give 101.1 g. (78% yield) tercopolymer having a reduced viscosity of 2.4. On compression-moulding at 200° C. it produced a pale yellow transparent plaque having full and one-tenth Vicat softening points of 99° C. and 89° C. respectively and a flexural strength of 19.0 kg./mm.².

---
[1] See footnote at bottom of col. 24.

EXAMPLE 39

Using the process described in Example 38, 116 g. (83.5% yield) of tercopolymer having a reduced viscosity of 2.05 were obtained from N-phenylmaleimide (26.0 g.; 7.5 mole percent), acrylonitrile (74.2 g.; 70 mole percent) and vinyl acetate (38.7 g.; 22.5 mole percent). The transparent yellow compression-moulding had full and one-tenth Vicat softening points of 113° C. and 104° C. respectively and a flexural strength of 19.3 kg./mm.$^2$.

EXAMPLE 40

Using the process described in Example 38, 116 g. (81% yield) of tercopolymer having a reduced viscosity of 1.62 were obtained from N-phenylmaleimide (34.6 g.; 10 mole percent), acrylonitrile (74.2 g.; 70 mole percent) and vinyl acetate (34.4 g.; 20 mole percent). Its melt viscosity was about 18 kp. The pale yellow transparent compression-moulding had full and one-tenth Vicat softening points of 123° C. and 113° C.

EXAMPLE 41

Using the process described in Example 38, but with the addition of dodecanethiol as chain-transfer agent at 1% by weight of the total weight of the three monomers and employing twice as much potassium persulphate (3.0 g.) and sodium metabisulphite (2.1 g.) as catalyst, polymers were produced from six monomer mixtures containing 5 mole percent of N-phenylmaleimide (17.3 g.), 70–95 mole percent of acrylonitrile and 25–0 mole percent of vinyl acetate, the sixth (with no vinyl acetate) being outside the scope of the present invention. The properties of the polymers are given in the following table, where the weights of acrylonitrile and vinyl acetate are in grams followed by the mole percent in parentheses, the yield of polymer is in grams followed by the percentage yield in parentheses, R.V. is the reduced viscosity, the flexural strength is in kg./mm.$^2$, and the melt viscosity is in kp.

POLYMERS FROM 5 MOLE PERCENT OF N-PHENYLMALEIMIDE

| Acrylonitrile | Vinyl acetate | Polymer yield | R.V. | Vicat, °C. 0.1 | Vicat, °C. Full | Flexural strength | Melt viscosity |
|---|---|---|---|---|---|---|---|
| 74.2 (70) | 43.0 (25) | 105 (78) | 1.20 | 78 | 103 | 20.2 | 8.7 |
| 79.5 (75) | 34.4 (20) | 108 (82) | 1.06 | 72 | 103 | 17.5 | 7.6 |
| 84.8 (80) | 25.8 (15) | 105 (82) | 0.98 | 93 | 108 | 14.6 | 6.8 |
| 90.1 (85) | 17.2 (10) | 105 (84) | 0.66 | 99 | 116 | 12.3 | 7.0 |
| 95.4 (90) | 8.6 (5) | 107 (88) | 0.99 | 106 | 133 | 8.5 | 7.5 |
| 100.7 (95) | 0 (0) | 105 (89) | 0.87 | 161 | 193 | 3.0 | 45 |

The compression mouldings were all transparent and yellow; the second and third were pale, and the sixth was amber in colour.

EXAMPLE 42

A copolymer was made using a modification of the process described in Example 38, employing N-phenylmaleimide (17.3 g.; 5 mole percent), acrylonitrile (79.5 g.; 75 mole percent) and vinyl chloride (25 g.; 20 mole percent). The vinyl chloride was introduced after the other ingredients had been de-gassed in the autoclave by pressurising with nitrogen and venting, and the polymerisation was conducted for only 2 hours. The polymer (98 g.; 81% yield) had a reduced viscosity of 4.5. On compression-moulding it gave a transparent amber plaque having full and one-tenth Vicat softening points of 148° C. and 117° C. respectively.

EXAMPLE 43

A copolymer was made using the process described in Example 38, employing N-phenylmaleimide (17.3 g.; 5 mole percent) acrylonitrile (79.5 g.; 75 mole percent) and ethyl vinyl ether (28.8 g.; 20 mole percent). The polymer (57.6 g.; 46% yield) had a reduced viscosity of 10.2, full and one-tenth Vicat softening points of 99° C. and 88° C. respectively and a flexural strength of 13.5 kg./mm.$^2$.

By employing twice as muh catalyst (3.0 g. of potassium persulphate and 2.1 g. of sodium metabisulphite) with conditions otherwise the same, the tercopolymer was produced in 81.5% yield (102.2 g.) and had full and one-tenth Vicat softening points of 103° C. and 87° C. respectively, a flexural strength of 10.5 kg./mm.$^2$, and a melt viscosity of 18 kp.

EXAMPLE 44

Copolymers containing methyl acrylate as third monmer were made using the process described in Example 38, but with the addition of 0.25% octanethiol as chain-transfer agent and empolying 0.25% potassium persulphate as catalyst together with an equimolar amount of sodium metasulphite, the percentages being by weight of the total weight of the three monomers. The amount of water was 300 g. Polymers were thus produced from five monomer mixtures containing 5 mole percent of N-phenylmaleimide (17.3 g.), 65–85 mole percent of acrylonitrile and 30–10 mole percent of methyl acrylate. The properties of the polymers are given in the following table, where the weights of acrylonitrile and methyl acrylate are in grams followed by the mole percent in parentheses, the yield of polymer is in grams followed by the percentage yield in parentheses, R.V. is the reduced viscosity, the flexural strength is in kg./mm.$^2$, and the melt viscosity is in kp.

POLYMERS FROM 5 MOLE PERCENT OF N-PHENYLMALEIMIDE

| Acrylonitrile | Methyl acrylate | Polymer yield | R.V. | Vicat, °C. 0.1 | Vicat, °C. Full | Flexural strength | Melt viscosity |
|---|---|---|---|---|---|---|---|
| 68.9 (65) | 51.6 (30) | 123 (89) | 1.08 | 74 | 88 | 17.4 | 5.9 |
| 74.2 (70) | 43.0 (25) | 112 (83) | 1.36 | 70 | 90 | 19.5 | 8.5 |
| 79.5 (75) | 34.4 (20) | 113 (86) | 1.82 | 74 | 96 | 21.4 | 11 |
| 84.8 (80) | 25.8 (15) | 109 (95) | 2.43 | 89 | 101 | 19.6 | 12 |
| 90.1 (85) | 17.2 (10) | 100 (80) | 4.04 | 95 | 102 | 20.7 | 17 |

The compression mouldings were all transparent and yellow; the first and second were pale and the fifth was amber in colour.

All were amorphous (by X-ray crystallography) as made and all but the fifth were also amorphous when annealed from 180° C.; the fifth developed some two-dimensional order on annealing.

EXAMPLE 45

A copolymer was made using the process described in Example 38, employing N-phenylmaleimide (17.3 g.; 5 mole percent), acrylonitrile (79.5 g.; 75 mole percent) and ethyl acrylate (40 g.; 20 mole percent). The polymer (126 g.; 92% yield) had a reduced viscosity of 1.91, and on compression-moulding produced a pale yellow transparent plaque having full and one-tenth Vicat softening points of 88° C. and 79° C. respectively, and a flexural strength of 16.8 kg./mm.$^2$. Its melt viscosity was 11 kp.

A copolymer made in the same way from 80 mole percent of acrylonitrile and 20 mole percent of ethyl acrylate in 76% yield had a reduced viscosity of 9.86 and full and one-tenth Vicat softening points of 73° C. and 54° C. respectively, and the very pale yellow transparent compression-moulding had a flexural strength of 16 kg./mm.$^2$.

EXAMPLE 46

A copolymer was made using the process described in Example 38, employing N-phenylmaleimide (17.3 g.; 5 mole percent), acrylonitrile (79.5 g.; 75 mole percent) and methyl methacrylate (40 g.; 20 mole percent). The polymer (126 g.; 92% yield) had a reduced viscosity of 5.45. On compression-moulding it formed a very pale yellow transparent plaque having full and one-tenth Vicat softening points of 125° C. and 102° C. respectively, and a flexural strength of 11.5 kg./mm.$^2$.

EXAMPLE 47

N-2-chlorophenylmaleimide (145.3 g.; 0.5 mole percent), acrylonitrile (556.5 g.; 75 mole percent), methyl acrylate (240.8 g.; 20 mole percent), potassium persulphate (4.7 g.), sodium metabisulphite (3.29 g.), octanethiol (4.71 g.), sodium dodecyl sulphate (5.03 g.) and water (2.875 kg.) were placed in a shaking autoclave which was then pressurised to 7 kg./cm.$^2$ with nitrogen and vented three times. The polymerisation proceeded for 4 hours at 30° C. with shaking under nitrogen at 5.5 kg./cm.$^2$. The pressure was then released and the latex was coagulated by the addition of saturated calcium chloride solution. The precipitate was filtered off, washed three times with hot wtaer and twice with methanol and dried in vacuum at 70° C. to give 753 g. (80% yield) of copolymer having a reduced viscosity of 0.85. The full and one-tenth Vicat softening points were 89° C. and 82° C. respectively. On compression-moulding at 200° C. it formed a very pale yellow transparent plaque having a flexural strength of 10.8 kg./mm.$^2$ and a tensile strength of 11.0 kg./mm.$^2$. At −180° C. its flexural strength was 19.7 kg./mm.$^2$. Its melt viscosity was 3.8 kp., and increased by 10% over 5 minutes.

This product was injection-moulded at 260–265° C. on a single-screw preplasticising injection-moulding machine. The mould was easily filled giving pale yellow transparent plaques. Measured across the line of flow (not near the sprue), the flexural strength was 16.8 kg./mm.$^2$. Along the line of flow, the flexural strength was 19.9 kg./mm.$^2$ and the tensile strength was 13.0 kg./mm.$^2$. The notched sample impact strength across the line of flow was 1.4×10$^6$ dynes/cm.

EXAMPLE 48

A copolymer was made using the process described in Example 38, employing N-2-methylphenylmaleimide (18.7 g.; 5 mole percent), acrlyonitrile (79.5 g.; 75 mole percent) and methyl acrylate (34.4 g.; 20 mole percent), with potassium persulphate (0.34 g.) and sodium metabisulphite (0.23 g.), and coagulating the latex with saturated calcium chloride solution. The polymer (110 g.; 83% yield) had a reduced viscosity of 9.23 and gave a pale yellow transparent plaque on compression-moulding at 200° C. Its tensile strength was 11.7 kg./mm.$^2$, and its flexural strength at −180° C. was 25.7 kg./mm.$^2$.

EXAMPLE 49

A copolymer was made using the process described in Example 48, employing N-2-nitrophenylmaleimide (21.8 g.; 5 mole percent). The polymer (96 g.; 71% yield) had a reduced viscosity of 3.19 and a tensile strength (compression-moulded sample) of 11.5 kg./mm.$^2$.

EXAMPLE 50

A copolymer was made using the process described in Example 48, employing N-(mixed dimethylphenyl)maleimide (20.1 g.; 5 mole percent). The polymer (103 g.; 76% yield) had a reduced viscosity of 9.32 and on compression-moulding formed a pale yellow transparent plaque. Its tensile strength was 11.5 kg./mm.$^2$, and its flexural strength at −180° C. was 20.3 kg./mm.$^2$. Its full and one-tenth Vicat softening points were 95° C and 88° C. respectively.

EXAMPLE 51

A copolymer was made using the process described in Example 48 at three-quarters the scale, employing N-2,6-dimethyl-phenylmaleimide (15 g.; 5 mole percent). The polymer (78 g.; 91% yield) had a reduced viscosity of 7.93 and a tensile strength (compression-moulded sample) of 10.7 kg./mm.$^2$.

EXAMPLE 52

A copolymer was made using the process described in Example 48, employing N-2,4,6-trichlorophenylmaleimide (27.7 g.; 5 mole percent), with potassium persulphate (0.37 g.) and sodium metabisulphite (0.26 g.). The polymer (106 g.; 75% yield) had a reduced viscosity of 12.35 and a tensile strength (compression-moulded sample) of 10.6 kg./mm.$^2$.

We claim:

1. A soluble, thermoplastic copolymer which is the product of polymerizing, under conditions of free radical catalysis, a mixture which consists essentially of from 1 to 99 mole percent of acrylonitrile and from 1 to 99 mole percent of N-aryl maleimide in which the aryl group is selected from the group consisting of phenyl, 4-diphenyl, 1-naphthyl, methyl- and diethylphenyl, mono- and diahalophenyl, 2,4,6-trichlorophenyl, 2,4,6-tribromophenyl, 4-n-butylphenyl, 2-methyl-4-n-butylphenyl, 4-benzylphenyl, 2-, 3- and 4-methoxyphenyl, 2-methoxy-5-chlorophenyl, 2-methoxy-5-bromophenyl, 2,5-dimethoxy-4-chlorophenyl, 3- and 4-ethoxyphenyl, 2,5-diethoxyphenyl, 4-phenoxyphenyl, 4-methoxycarbonylphenyl, 4-cyanophenyl, 2-, 3- and 4-nitrophenyl and methylchlorophenyl (2,3-, 2,4-, 2, 5-, and 4,3-isomers).

2. A thermoplastic copolymer which is soluble in solvents for polyacrylonitrile and which consists essentially of from 25 to 90 mole percent of acrylonitrile, from 1 to 25 mole percent of at least one N-aryl maleimide selected from the group consisting of N-phenyl maleimide, N-4-diphenyl maleimide, N-1-naphthyl maleimide, N-methylphenyl maleimide, dimethylphenyl maleimide, an N-2,6-di-ethyl-phenyl maleimide, N-mono- and dihalo-phenyl maleimide, N-2,4,6-trichlorophenyl maleimide, N-2,4,6-tribromophenyl maleimide, N-4-n-butylphenyl maleimide, N-2-methyl-4-n-butylphenyl maleimide, N-4-benzylphenyl maleimide, N-2, 3- and 4-nitro-phenyl maleimide and N-methyl-chlorophenyl maleimide (2,3-, 2,4-, 2,5- and 4,3-isomers) and from 0 to 70 mole percent of at least one other ethylenically unsaturated monomer copolymerizable therewith of which any alkene is present in amount from 0 to 50 mole percent and the molar ratio of any carbocyclic aromatic olefin to acrylonitrile lies within the range 0.5 to 4, the quantities being chosen to total 100 mole percent and the copolymer being the product of polymerizing a mixture of the monomers under conditions of free radical catalysis.

3. A copolymer in which the units consist essentially of 1 to 50 mole percent of acrylonitrile, 1 to 98 mole percent of at least one conjugated aromatic olefin, 1 to 50 mole percent of at least one N-aryl maleimide and in which the molar of olefin to acrylonitrile lies within the range of 0.5 to 4.

4. A copolymer according to claim 3 in which the conjugated aromatic olefin is styrene, α-methyl styrene or a mixture of styrene and α-methyl styrene.

5. A soluble, thermoplastic copolymer which is the product of polymerizing, under conditions of free radical catalysts, a mixture which consists essentially of from 1 to 98 mole percent of acrylonitrile, from 1 to 98 mole per- ---
[1] "Blendex," "Firestone FR–S," "Polysar," "Diakon" and "Tyril are trademarks of Marbon Chemical Division Borg Warner Limited, Firestone Synthetic Rubber and Latex Company, Polymer Corporation Limited, Imperial Chemical Industries Limited, and the Dow Chemical Company, respectively.

cent of at least one N-aryl maleimide in which the aryl group is selected from the group consisting of phenyl, 4-diphenyl, 1-naphthyl, methyl- and dimethyl-phenyl, 2,6-diethylphenyl, mono- and dihalophenyl, 2,4,6-trichlorophenyl, 2,4,6-tribromophenyl, 4-n-butylphenyl, 2-methyl-4-n-butylphenyl, 4-benzylphenyl, 2-, 3- and 4-methoxyphenyl, 2-methoxy-5-chlorophenyl, 2-methoxy-5-bromophenyl, 2,5-dimethoxy-4-chlorophenyl, 2-, 3- and 4-ethoxyphenyl, 4-phenoxyphenyl, 4-methoxycarbonylphenyl, 4-cyanophenyl, 2-, 3- and 4-nitrophenyl and methylchlorophenyl (2,3-, 2,4-, 2,5- and 4,3-isomers) and from 1 to 50 mole percent of at least one aliphatic olefin which is copolymerizable by free radical catalysis, the quantities being chosen to total 100%.

6. A copolymer according to claim 2 which consists essentially of from 40 to 90 mole percent of acrylonitrile, from 1 to 15 mole percent of at least one N-aryl maleimide and from 5 to 50 mole percent of at least one other ethylenically unsaturated monomer copolymerizable therewith and selected from the group consisting of methyl, ethyl, n-butyl and 2-hexylacrylates and methyl and n-butyl methacrylates, vinyl acetate, vinyl ether, vinyl chloride, and an unsaturated nitrile other than acrylonitrile.

7. A copolymer according to claim 5 which consists essentially of from 60 to 90 mole percent of acrylonitrile, from 1 to 15 mole percent of N-aryl maleimide and from 5 to 30 mole percent of olefin.

8. A copolymer according to claim 2 which consists essentially of from 60 to 90 mole percent of acrylonitrile, from 1 to 15 mole percent of at least one N-aryl maleimide and from 5 to 30 mole percent of at least alkene.

9. A copolymer according to claim 2 consists essentially of from 25 to 50 mole percent of acrylonitrile, from 1 to 20 mole percent of at least one N-aryl maleimide and 40 to 70 mole percent of at least one conjugated carbocyclic aromatic olefin.

10. A copolymer according to claim 9 in which the molar ratio of aromatic olefin to acrylonitrile lies within the range 1 to 4.

11. A copolymer according to claim 1 in which the N-aryl maleimide content lies within the range from 10 to 60 mole percent of N-aryl maleimide.

12. A copolymer according to claim 5 in which the olefin is an alkyl-substituted ethylene.

13. A copolymer according to claim 12 in which the olefin is isobutene.

14. A copolymer according to claim 2 in which the N-aryl maleimide is selected from the group consisting of N-phenyl maleimide, N-2-chlorophenyl maleimide, the N-2-alkylphenyl maleimide, an N-dimethylphenyl maleimide, N-2-nitrophenyl maleimide and N-2,4,6-trichlorophenyl maleimide.

15. A copolymer according to claim 1 in which the N-aryl maleimide is N-phenyl maleimide.

16. A copolymer according to claim 5 in which the N-aryl maleimide is selected from the group consisting of N-phenyl maleimide and N-2-chlorophenyl maleimide.

17. A copolymer according to claim 5 which consists essentially of from 71 to 74 mole percent of acrylonitrile, from 5 to 8 mole percent of N-phenyl maleimide and from 19 to 21 mole percent of isobutene.

References Cited
UNITED STATES PATENTS 3,352,832   11/1967   Nield et al. _____ 260—78 UA HAROLD D. ANDERSON, Primary Examiner U.S. Cl. X.R.

260—41 AR, 29.6 AN, 78 UA, 78 S, 873, 879, 880, 899 901